(12) United States Patent
Rottman et al.

(10) Patent No.: US 10,380,167 B1
(45) Date of Patent: Aug. 13, 2019

(54) MULTI-VOLUME CONTENT MAPPING

(71) Applicant: Amazon Technologies, Inc., Reno, NV (US)

(72) Inventors: Jeremy Allan Rottman, Seattle, WA (US); Kyle Thomas Donnelly, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 841 days.

(21) Appl. No.: 14/828,056

(22) Filed: Aug. 17, 2015

(51) Int. Cl.
*G06F 16/48* (2019.01)
*G06F 16/435* (2019.01)
*H04L 29/08* (2006.01)

(52) U.S. Cl.
CPC ............ *G06F 16/435* (2019.01); *G06F 16/48* (2019.01); *H04L 67/306* (2013.01)

(58) Field of Classification Search
CPC .. G06F 17/211; G06F 3/0483; G06F 15/0291; G06F 16/435; G06F 16/48; H04L 67/306
See application file for complete search history.

(56) References Cited

U.S. PATENT DOCUMENTS

| 9,218,320 | B2* | 12/2015 | Ierullo | G06F 17/30861 |
| 2012/0233242 | A1* | 9/2012 | Murray | H04L 67/22 709/203 |
| 2016/0231921 | A1* | 8/2016 | Landau | G06F 3/04883 |

* cited by examiner

*Primary Examiner* — Rinna Yi
(74) *Attorney, Agent, or Firm* — Hogan Lovells US LLP

(57) ABSTRACT

Automated mapping between instances of content, such as e-books, and omnibus versions of that content can be performed without a resource-intensive full string search. In one embodiment, an efficient string search algorithm, such as the Boyer-Moore algorithm, is used to pre-process the individual book in order to more efficiently search for a match within the omnibus version. In another embodiment, a fingerprinting process is used to quickly find the beginning and end positions of a book within the omnibus version. The fingerprinting process can also quickly verify the match between the identified portion of the omnibus and the contents of the individual book without the need for a full string comparison. A mapping is then generated that enables the supplemental content to be updated for the omnibus version.

18 Claims, 7 Drawing Sheets

MULTI-VOLUME CONTENT MAPPING

BACKGROUND

Users are increasingly using electronic devices to access a variety of content, such as e-books and media files. In some cases, a user will read an e-book on a device such as an e-reader and make various notes or annotations to the book. Books can be part of a series of books that are sold separately (i.e., The Hunger Games), television shows can be episodes of a series where each episode is downloaded or broadcast individually, and audio files can be part of a collection of audio files, such as on an album. In the past, during the creation of an album, for example, clear digital markers (e.g., physical separation between tracks) were inserted to identify separation of songs at the time the compact disc was created or burned. This is not an optimal solution for new technology, including new cloud-based storage systems. Thus, discussed herein is new technology that solves problems introduced by existing technology. For example, in some cases a user might want to keep his or her notes or annotation for the book already read, and transfer those notes or annotations. The technology presented herein provides mechanisms for performing such actions and obtaining such results.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to managing user-provided supplemental content in an electronic environment. In particular, various embodiments provide for the automated mapping between individual instances of content, such as e-books, and omnibus versions of that content without requiring a resource-intensive full string search process. In one embodiment, an efficient string search algorithm, such as the Boyer-Moore search algorithm, can be used to pre-process the content of the individual book in order to more efficiently search for a match within the omnibus version. In another embodiment, a fingerprinting process can be used to quickly find the beginning and end positions of a book within an omnibus version. A fingerprinting process can also be used to quickly verify the match between the identified portion of the omnibus and the contents of the individual book without the need for a full string comparison. Once the corresponding position is determined, a mapping or set of position associations can be generated that can enable the supplemental content (e.g., bookmarks, highlights, annotations, comments, etc.) to be updated to the corresponding position in the omnibus version.

Various other functions and advantages are described and suggested below as may be provided in accordance with the various embodiments.

Figure 1:
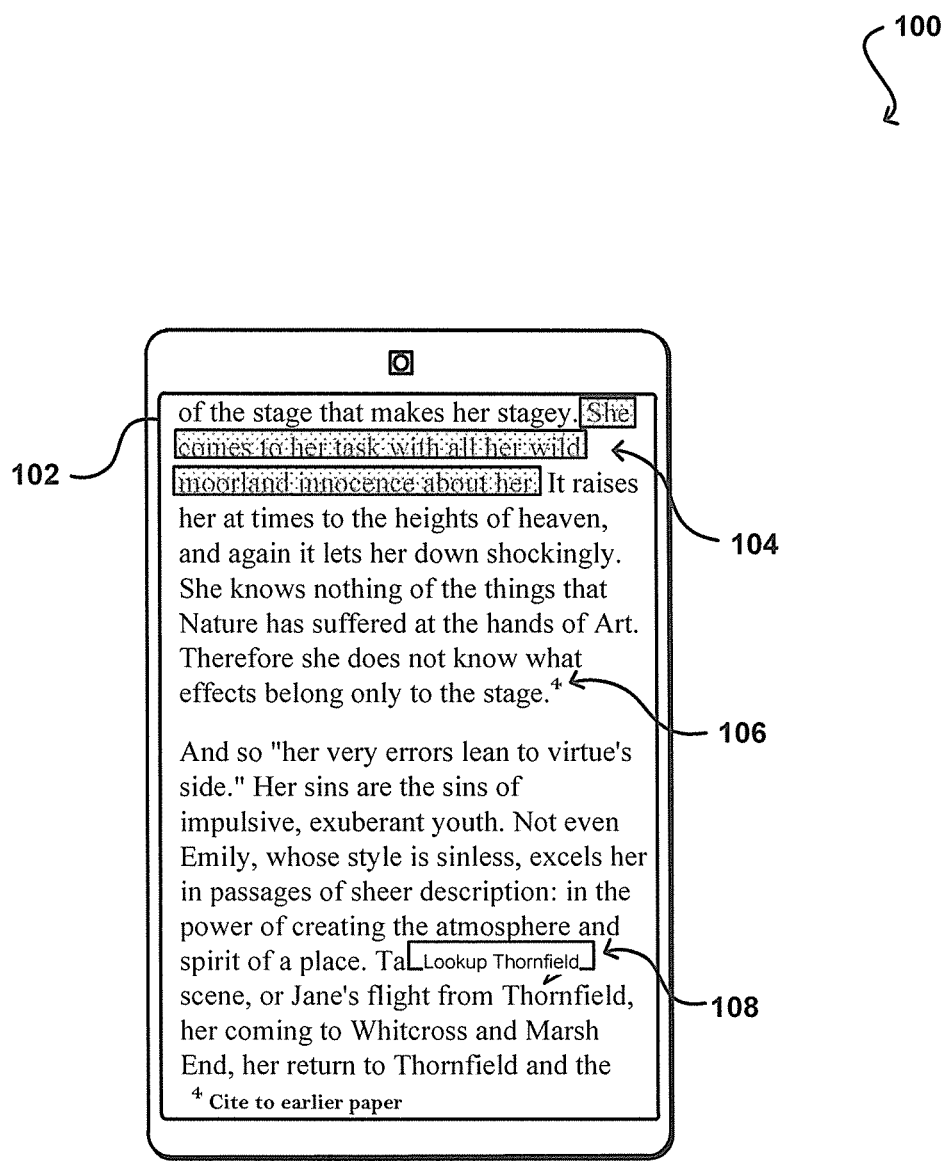
FIG. 1 illustrates annotations and other user input added to digital content that can be utilized in accordance with various embodiments.

FIG. 1 illustrates an example display 100 of content that can take advantage of aspects of the various embodiments. In this example, a computing device 102 (or e-book reader or other such device) is displaying a page 102 (or other such grouping) of electronic book (or "e-book") content corresponding to an e-book purchased by a user of the device, although as discussed elsewhere herein other types of digital content can be utilized as well, as may include video or audio content, webpage content, PDF content, and the like. Further, although a portable computing device is illustrated for purposes of this example, it should be understood that various other types of devices can be utilized to display the content as well, as may include a tablet computer, a smart phone, a desktop computer, a notebook computer, a personal data assistant, a smart phone, a video gaming console, a television set top box, a wearable computer (e.g., a smart watch or glasses), or a portable media player, among other such devices. As known for such purposes, a user can navigate through the content using input mechanisms of the device in order to read the e-book or at least obtain access to portions of interest to the user.

In some instances the user might want to make notes or otherwise add information to the digital content. For example, the user might want to highlight certain sections of interest, which can then appear as highlighted sections 104 as illustrated in FIG. 1. The user might also want to add annotations, such as footnotes 106, comments 108, or sharing/messaging annotations (not shown), among other such options. The user might want to add other information for subsequent access and/or use as well, such as may include bookmarks, audio comments, links to related content, graphical highlights, shared annotations, shared reading sessions, and the like. When the user subsequently returns to the appropriate position in the digital content, the user can have access to those annotations, notes, etc. In some embodiments this "supplemental content" as referred to herein can be stored as metadata with the e-book content, or can be stored in a separate file that includes position data for each comment or annotation with respect to the position in the digital content. This supplemental content can be stored on the device or in a remote data storage location, which can enable the supplemental content to be accessible from additional devices as well.

It might be the case, however, that a device displays an e-book or other singular instance of content, whereby annotations can be stored for the singular instance. Subsequently the device might obtain access to an "omnibus" version including the singular instance of content along with other related content. This can occur when, for example, a book is part of a series of books, or when the book is one of a set of books from the same author or relating to the same topic, among other such options. An advantage of an omnibus version is that the additional books or instances of content can be obtained without having to separately buy the individual e-books. This can provide cost savings, as well as enable the management of fewer separate files in a digital library.

Figures 2A, 2B, 2C:
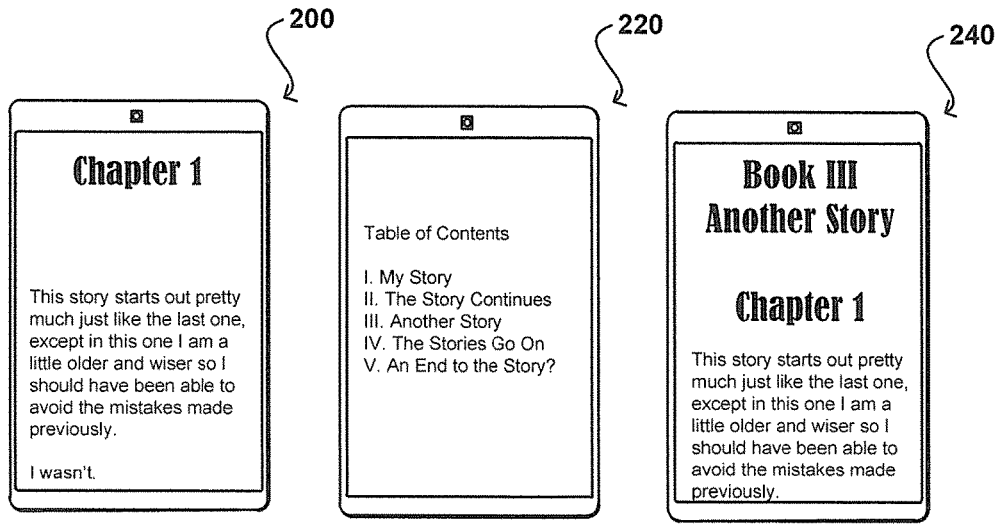
FIGS. 2A, 2B, and 2C illustrate example views of content for a single e-book and an omnibus e-book that can be utilized in accordance with various embodiments.

If the device switches to the omnibus version, however, conventional approaches will not be able to transfer over any of the notes or annotations from the book(s) that were previously accessed individually. In order to transfer the annotations, for example, the respective positions can be determined from within the omnibus version. Because the individual book(s) can be at various positions in the omnibus book, those positions would first have to be determined within the omnibus version. While a full string search could be perforated, such a process can be very time and resource consuming, which can be undesirable for providers with a large number of customers. Further, the content can vary slightly between versions. For example, the situation 200 displayed in FIG. 2A shows the first page of content of a single e-book. Because the book is a singular instance of content, including only the specific book, the first page refers only to the chapter and does not need to include any information about any other books or provide any other such information. The omnibus version, on the other hand, includes content from multiple individual books or instances. Accordingly, the first page 220 of the omnibus version, as illustrated in FIG. 2B, is a table of contents indicating where the individual books can be located in the omnibus version. Such a table would not match a page of content of any of the individual books, however, that are contained within the omnibus version. The first page 240 of the individual book that is located in the omnibus version still includes the chapter information from the individual version but as illustrated in FIG. 2C can include additional and/or alternative information as well, as the publisher or author might have made slight modifications or additions, as may make sense for the omnibus version. It can be difficult to know how much of the omnibus a specific book represents, where in the omnibus version that book content occurs, and how to account for variations when doing a comparison process.

Figure 3A:
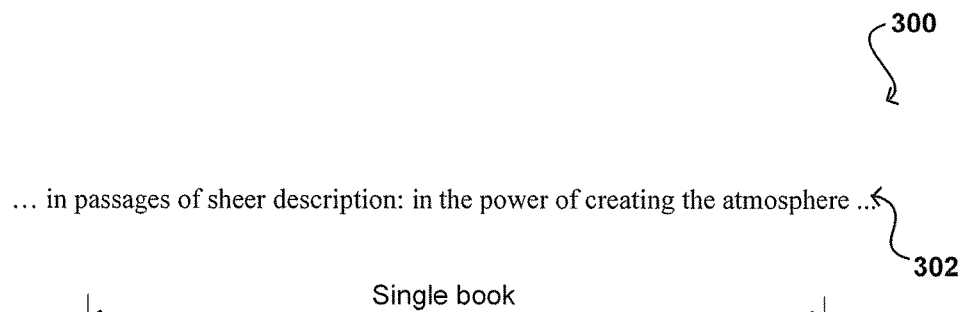
FIGS. 3A and 3B illustrate graphical representations of content that can be mapped in accordance with various embodiments.
Figure 3B:
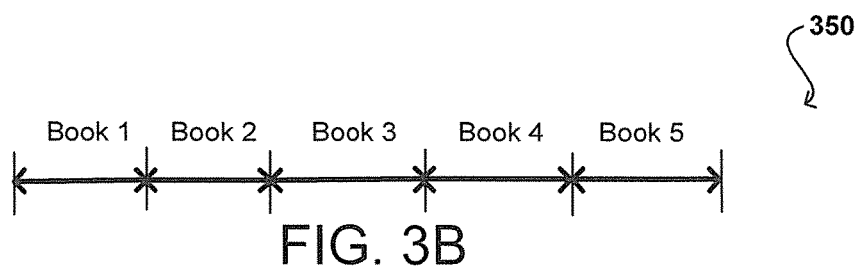

To transfer the supplemental content from the single version of the book to the omnibus version, it can be necessary in at least some embodiments to determine some level of content mapping between the versions. As illustrated in the example book layout 300 of FIG. 3A, the layout all relates to a single book, where the book content can be represented by a string 302 of characters with corresponding positions, and no breaks between books or other instances. The entire content of the single book can include position data for specific annotations, notes, and other customer-provided supplemental content that relate to the specific individual book. When comparing against the omnibus book layout 350 as illustrated in FIG. 3B, the individual books can be located at various locations in the book layout. In order to locate the appropriate single book, the location of the single book content in the omnibus book layout can be determined, such that the content from the individual book (s) of the omnibus version can be compared against the single book of interest for purposes of identifying the matching portion and determining how to transfer over the supplemental content. This can include determining at least a start or an end position for each individual book in the omnibus version.

Figure 4:
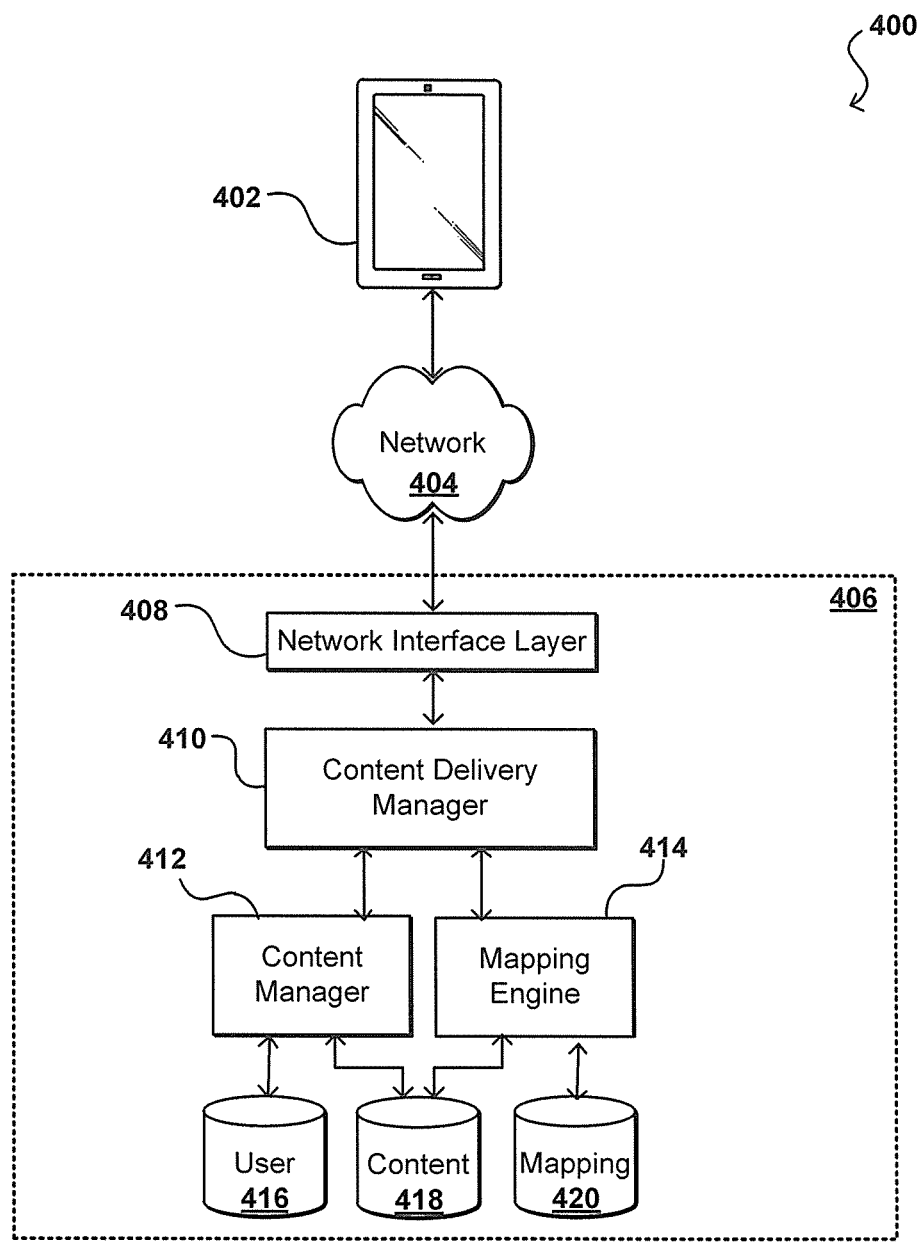
FIG. 4 illustrates an example system that can be utilized to implement aspects of the various embodiments.

FIG. 4 illustrates an example environment 400 in which digital content, such as e-book content, can be provided to a user. In this example, a user can utilize an electronic device 402, such as an e-book reader, to purchase, download, or otherwise obtain e-book content. For example, a user can cause the device to submit a request for the digital content across at least one appropriate network 404, whereby the content (or at least a portion of the content) can be returned for presentation on the device. The network 404 can include any appropriate network, such as may include the Internet, a local area network (LAN), a cellular network, and the like. The request can be sent to an appropriate content provider 406, as may provide one or more services, systems, or applications for processing such requests and providing access to the appropriate content. In this example, the request is received to a network interface layer 408 of the content provider system 406. The network interface layer can include any appropriate components known or used to receive requests from across a network, such as may include one or more application programming interfaces (APIs) or other such interfaces for receiving such requests. The network interface layer 408 might be owned and operated by the provider, or leveraged by the provider as part of a shared resource or "cloud" offering. The network interface layer can receive and analyze the request, and cause at least a portion of the information in the request to be directed to an appropriate system, service, or component, such as a content manager 410. The content manager 412 can lookup information in a user data store 416 or other such location to determine whether the user has access rights to the content for the device, such as where the user has purchased the content for viewing on that device or has an account or profile with access to the content, among other such options. In some embodiments there can be multiple profiles associated with a particular account, such as where employees have individual profiles under an employer account or family members have individual profiles under a family account, among other such options. If access is granted to content under an account, the access can be for any or all of the profiles associated with the account. If the user has access rights, the content can be pulled from a content data store 418 or other such location and transmitted across the at least one network 404 (using the same or different component networks) for display on the device 402. Any metadata, or supplemental content as discussed elsewhere herein, can also be obtained from an appropriate repository, such as the content data store 418 or another appropriate data store within, or external to, the provider environment 406. In some embodiments a separate system or service can be used to store the metadata, which can then be accessed by any authorized user accessing a copy of the corresponding content.

As mentioned, as the user is viewing or otherwise consuming the content on the device 402, the user might add supplemental content such as notes, highlights, or annotations at specific positions in the content. The supplemental content can be stored locally on the device 402, and in some embodiments can be sent across the network 404 to be stored in the user data store 416 or similar such location. Storing the supplemental content remotely provides some level of redundancy, as well as enabling the supplemental content to be accessible by other devices associated with the user.

At some point, a request can be received from the device 402 to obtain an omnibus version of the content. In other embodiments, the device might have been obtained from another source but the user would like to transfer over the supplemental content. Various other situations may occur as well. In order to "transfer" the supplemental content from the individual book to the omnibus version, a determination can first be made by the content delivery manager 410, or another appropriate component, as to whether mapping information exists for the versions in a mapping data store 420 or otherwise. For example, an analysis of the omnibus version might have already been performed such that the mapping data exists and the supplemental content for the user can simply be updated with the corresponding position data for the omnibus version. The mapping data in at least some embodiments comprises a set of associations of positions of corresponding content in the individual content and in the omnibus version. This can include, for example, an association between the position of the beginning sentence in the individual book and the corresponding position in the omnibus version. Similar associations can be stored for the end portion, middle portions, and other selections portions or positions of the content as discussed and suggested herein. If the mapping data does not already exist, information can be passed to a mapping engine 414, or other such component or service, that can access content for the individual book and the omnibus version, such as from the content data store 418, and perform an analysis to obtain the appropriate mapping, which can then be stored to the mapping data store 420 and used to update the position data for the supplemental content in the omnibus version. In some embodiments the mapping data can enable the supplemental content to be accessible in the appropriate positions for either version.

Figure 5:
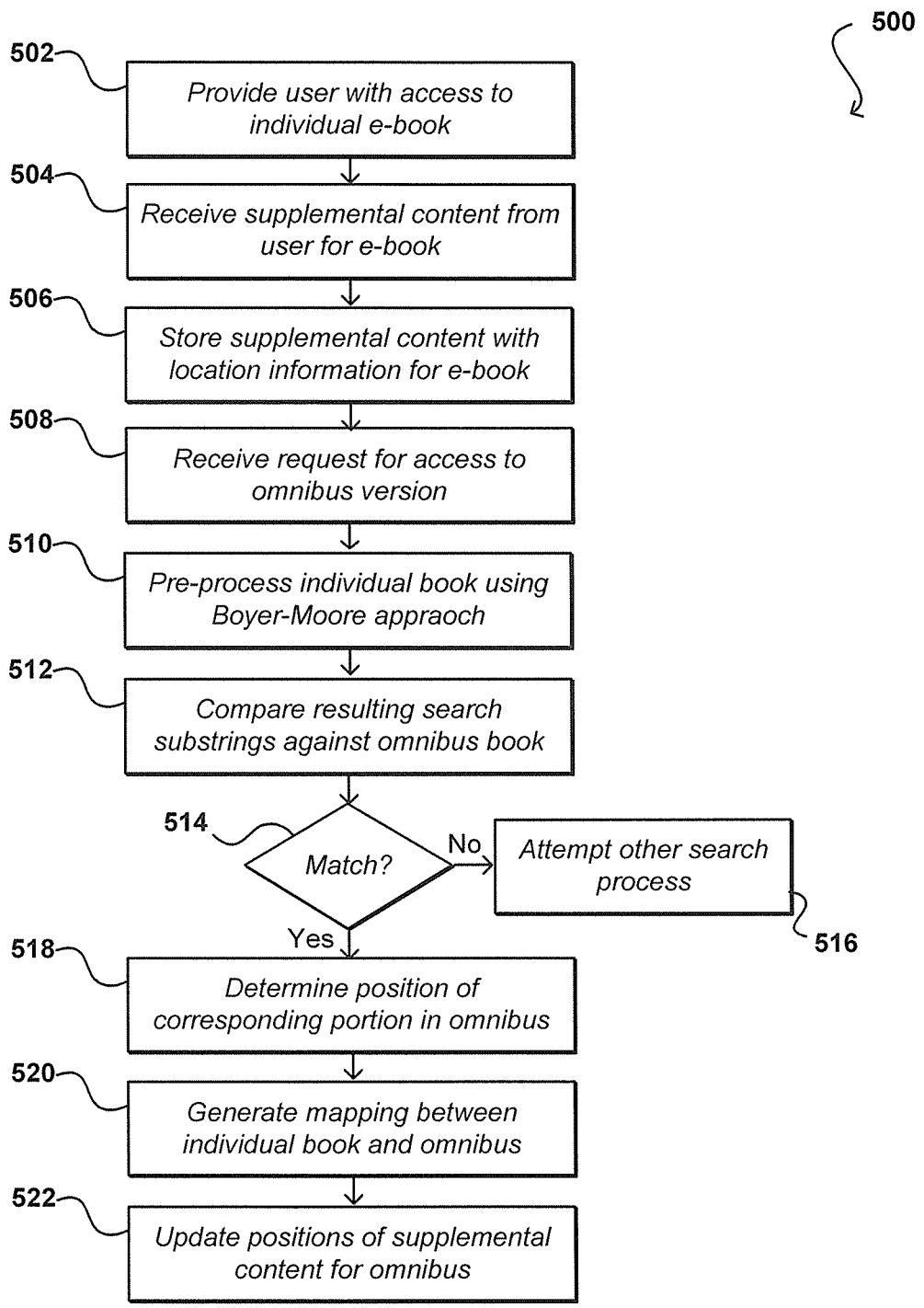
FIG. 5 illustrates a first example process for determining corresponding positions between two different versions of similar content that can be utilized in accordance with various embodiments.

Various approaches can be used in such an environment to determine the appropriate mapping between versions. FIG. 5 illustrates an overview of a first example process 500 for determining the position of individual content in an omnibus version that can be used in accordance with various embodiments. It should be understood that there can be fewer, additional, or alternative steps performed in similar or alternative orders, or in parallel, within the scope of the various embodiments unless otherwise stated. In this example, a user is provided 502 with access to an individual e-book, whether by providing the user with a full download to a determined device or enabling the device to obtain portions of the book as the user is accessing the e-book on the device. User input in the form of highlights, annotations, or other supplemental content can be received 504, which can then be stored 506 for access with the e-book on the device. Subsequently, a request can be received 508 for access to an omnibus version including the individual e-book content. This can include a request to purchase the omnibus version, a request to transfer supplemental content to the omnibus version, or another such request. In order to determine the appropriate positions for the supplemental content in the omnibus version, a mapping between the individual book and the omnibus version is to be determined.

In this example, the content of the individual book is pre-processed 510 using an efficient string search algorithm, such as the Boyer-Moore search algorithm. The Boyer-Moore approach generally involves pre-processing the search substring(s) but not the full string in which the search is being performed. This can be beneficial in situations such as where the omnibus version is significantly larger than the individual e-book. The pre-processing enables sections of the omnibus string to be skipped, allowing for much faster processing than for a full string search. A further benefit of using the Boyer-Moore approach is that the algorithm generally runs more quickly as the length of the search string increases. The Boyer-Moore approach also starts the matching from the end or "tail" of the search substring instead of the beginning, and can then jump ahead in the overall string by as many as the number of characters in the search substring. Each search string is essentially pre-processed into a pattern. The pattern is then compared 512 to a current search position of the content of the corresponding omnibus version. A pattern matching portion of the process is used to attempt to locate that string in the omnibus content with at least a minimum level of confidence. The pattern matching can compare the pattern for the current book with various positions in the omnibus content, starting at the tail of the search substring at each position and comparing the pattern to the relevant portion of the omnibus content. A confidence score for a match will be generated for each comparison. If the current position is not a match, or the confidence score for a location does not at least meet a minimum confidence value, a determination can be made 514 as to whether additional search positions in the omnibus book exist, or whether the entire omnibus content (or relevant portion) has been searched using the current pattern. If one or more additional portions remain, the process can update the search position forward in the content by an amount that is equal (or proportional) to the length of the search substring as discussed previously. If the entire content has been analyzed, another search process can be attempted 516, such as may involve a full string search or other process discussed elsewhere herein. If more search positions exist, the process can move to the next position as mentioned and continue from the next position. If the position is a match, or the processed pattern for the individual book corresponds to the string of the omnibus content at the current location with at least a minimum level of confidence, the position of the corresponding portion of the individual book in the omnibus book can be determined to have been located 518. This can include, for example, determining a corresponding start position of the individual instance in the omnibus version. Based on the corresponding position, and matches for each relevant substring or substring component, a mapping between corresponding positions of the individual book and the omnibus version can be generated 520. As mentioned the strings of each version can include characters at specified positions, and the mapping can include a relationship between a character position in the individual version and the corresponding character version in the omnibus version, for at least a specified subset of the character locations. The character locations selected can correspond to specific locations in the books in some embodiments, such as the beginnings of books, chapter titles, and the like. The positions of the supplemental content can then be updated 522 according to these mappings, such that the annotations appear in the correct positions in the omnibus version. For example, if an annotation occurred at character position 1,005 in the individual book and the mapping indicates that this corresponds to character position 4,236 in the omnibus version, then the annotation can be updated in the relevant metadata associated with the omnibus version to correspond to character position 4,236 in the omnibus version.

In some embodiments, the search substring can include at least five components of the individual book in order to assure a relatively accurate match process. These components can include, for example, paragraphs, pages, or pieces of content from the source material. These can be selected as the search substring and then pre-processed for comparison against the omnibus version. In at least some embodiments, the first and last paragraphs of the individual book can be used as the start and end positions for the matching process. For the matching process in some embodiments, three random selections from inside the individual book are selected and pre-processed for matching purposes. The matching can be performed, and if a match can be located with at least a minimum level of confidence then the mapping can be generated based on the position of the match. If a match cannot be located with a minimum level of confidence, or that has at most a maximum amount of variation, then another process can be attempted, such as may involve a larger, more general text search in the omnibus version. In some embodiments each character in an e-book has a position, and the mapping can involve doing a direct position-to-position mapping for each instance of supplemental content.

Figure 6A:
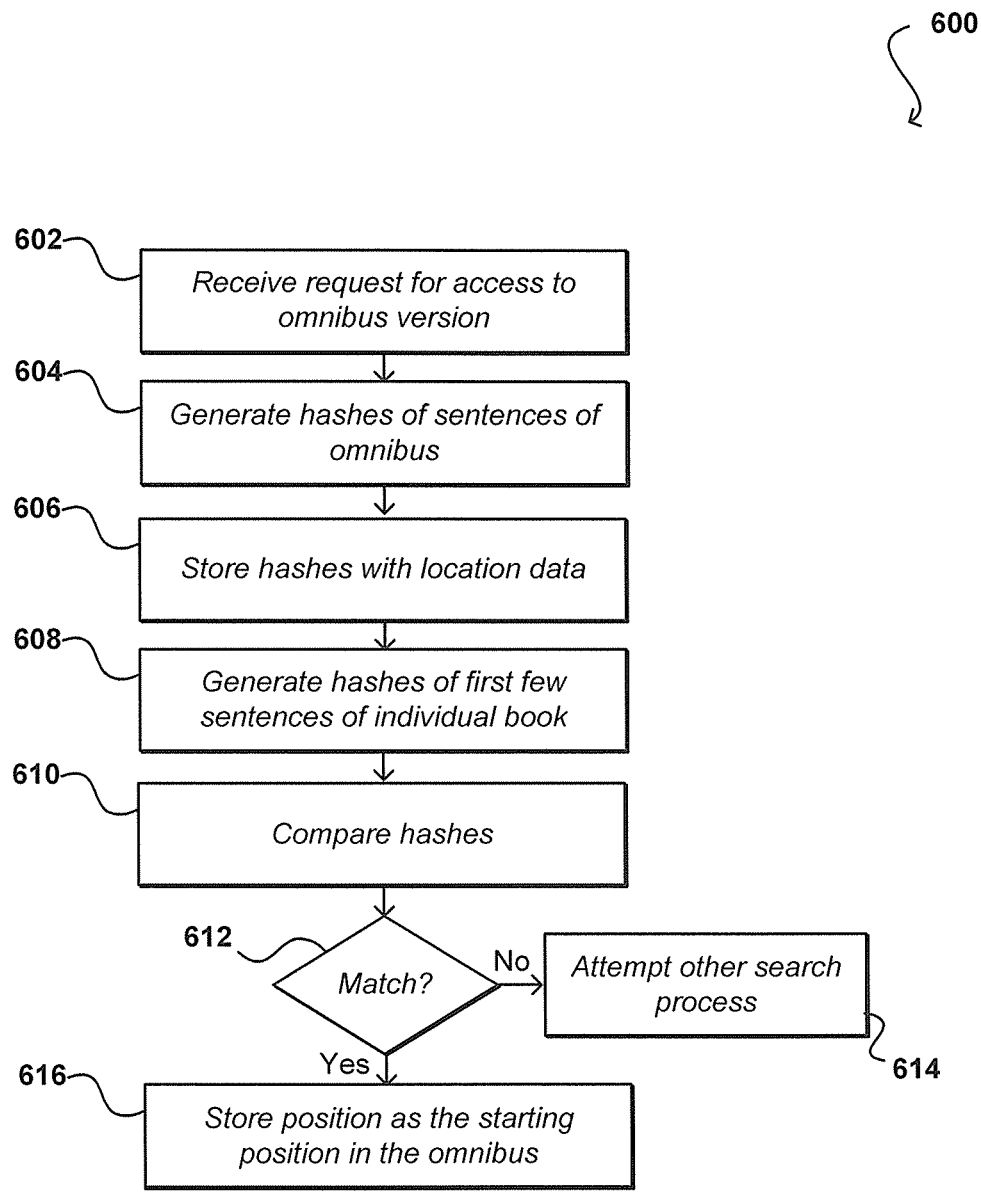
FIGS. 6A and 6B illustrate portions of a second example process for determining corresponding portions of content that can be utilized in accordance with various embodiments.
Figure 6B:
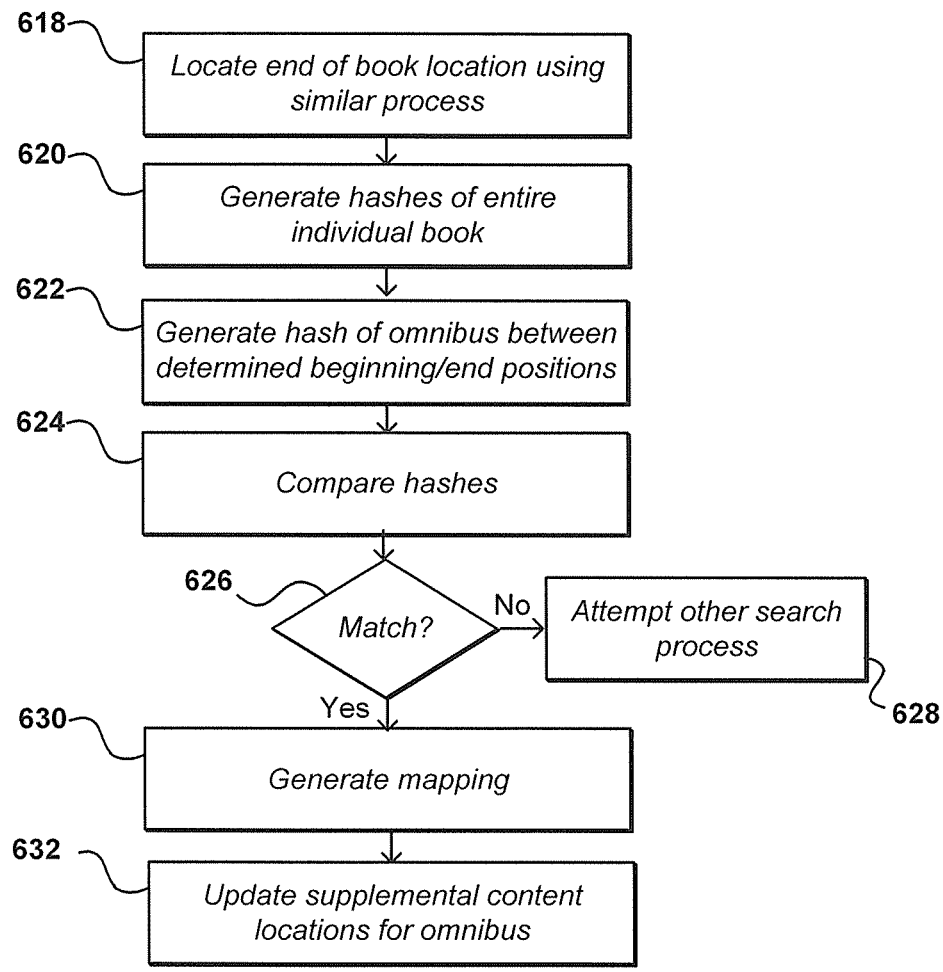

FIGS. 6A and 6B illustrate portions of another example process 600 for determining the position of individual content in an omnibus version that can be used in accordance with various embodiments. In this example, a user has provided annotations for an individual e-book as discussed previously. Subsequently, a request is received 602 for access to an omnibus version including the individual e-book content. In order to determine the appropriate positions for the annotations in the omnibus version, a fingerprinting or similar process can be used. In one embodiment, the fingerprinting process assists in locating the starting position of any or all individual books in the omnibus version. In this example, each sentence of the omnibus version is analyzed 604 using a hashing algorithm to convert the sentence to a number (or other such string). As mentioned, this can include using a hashing algorithm such as a linear hash, cryptographic hash, geometric hash, linear hash, perfect hash, rolling hash, almost linear hash, or other such hash algorithm to generate a string (hash value) of a deter wined size that is representative of the sentence that was processed using the hash algorithm. Any appropriate hashing function can be used that is able to map the digital data of the size of an arbitrary e-book to digital data of a fixed size, such as 64 characters. The hash value (or number) can be stored 606 with the position at which that sentence occurs in the omnibus version. The first few sentences of the individual book can also be analyzed 608 using the same fingerprinting process, such as by processing those sentences with the same hash algorithm to generate corresponding hash values. The hash values for the first few sentences of the individual book can then be compared 610, starting from an initial portion of the omnibus content, to the hash values for the sentences in the omnibus version. The comparison can allow for some amount of deviation. A confidence score can be generated for each matching pair, to indicate how closely the hash values match and, thus, how confident the comparison algorithm is that the hash values represent matching content. If the confidence value does not at least meet a minimum confidence value, the hash values can be determined to not correspond to the same content. If a match is not determined 612, then another approach can be used 614 to attempt to determine the locations of the corresponding content, such as may include a full string search. If a match is located, whereby the hash values are determined to correspond with at least a minimum level of confidence, that position can be stored 616 as the starting position of the individual book in the omnibus version.

In some embodiments this starting position can be used as a sufficient position from which to start the mapping process. In other embodiments a more accurate determination of the appropriate book position can be desired. In such an approach, as illustrated in FIG. 6B, a fingerprinting process can be used to locate 618 the end position of the book as well, such as by fingerprinting the last few sentences of the individual book and then scanning the omnibus book from the position of the start of the individual book position to find the matching end position. In order to ensure the proper match, however, the contents of the book between the start and end positions can be determined as well. In this example, the entire contents of the individual book from the first word of the first chapter to the last word of the last chapter can be fingerprinted 620 into a single string of the determined size. This can include not only body text, but images, tables, and other such content. The contents can be analyzed to generate a hash, for example, that is representative of the entire contents of the individual book. A hash can also be generated 622 of the contents of the omnibus version between the determined start and end positions, when then can be compared 624 against the hash of the individual book in order to determine whether the designated portion of the omnibus book matches the individual book. If the beginning and end positions of each book in the omnibus version are known, hashes of each book can be generated and compared against the hash of the individual book. A match can be verified if the fingerprint of the individual book is determined to correspond to the fingerprint of the corresponding section of the omnibus version while allowing for some small amount of variation (such as up to 5%, etc.). If the hashes do not sufficiently match, another search process can be attempted 628 as discussed previously. If the hashes are determined to match 626, the position of the individual book in the omnibus book can be determined to have been located. Based on the corresponding position, a mapping between corresponding positions of the individual book and the omnibus version can be generated 630. The positions of the supplemental content can then be updated 632 using the mapping such that the annotations appear in the correct positions in the omnibus version.

In some embodiments metadata might be available for the omnibus version that might provide start and end data. If the metadata can also identify which individual book is in each section in a standardized way, then that information can be used to determine the mapping. If not, the start and end positions can be used at starting positions for the fingerprinting and/or Boyer-Moore search approaches, among others. The metadata can function like HTML tags, for example, that are standardized tags that in this case would represent the start and end positions of each book in the omnibus version. In some embodiments the metadata can be used to store various types of "supplemental content, either with the e-book content or in a separate file that includes position data for each comment or annotation with respect to the position in the digital content. This supplemental content can be stored on the device or in a remote data storage location, which can enable the supplemental content to be accessible from additional devices as well. In at least some embodiments, information such as chapter breaks, book data, and other such information can be stored in a separate file, such as in a storage service, and associated with the book content as accessed by a particular user or multiple users. Accordingly, there can be some supplemental content that is available for all users and some that is specific to a certain user or group of users. Each word or character in a file such as an e-book can have a position, and that position can be referred to by the supplemental content. The position can be important, as the location of page breaks and other features can be dependent on factors such as screen size, screen resolution, font settings, and the like, such that the way the content is presented can vary between viewings, viewers, and/or devices. A user, publisher, or entity providing supplemental content can designate whether the content is to be shared among certain users, all users, or limited to a specific user or group of users, among other such options.

It should be understood that while e-books are used herein as a primary example, advantages of the various embodiments can be obtained with other types of content as well. For example, content such as PDF documents or websites can allow users to annotate text and images, whereby those annotations can be transferred to omnibus versions of that content. Similarly, audio and video compilations can use such approaches advantageously. A user might have watched one show in a series, or listened to one album by an artist, and then subsequently obtained a compilation that includes that individual work. Similar approaches can be used to determine the position of the individual work in the compilation and then generate an appropriate position mapping in order to transfer comments, annotations, etc. While fingerprinting or analyzing video can require different fingerprinting technology, such as may rely upon feature extraction algorithms that process key frames, color, and motion changes during a video sequence, approaches in accordance with various embodiments can utilize key frames in the video to simplify the process. In one embodiment each key frame in a video can be hashed, and compared against the hashes for key frames in the omnibus version. While the Boyer-Moore approach may be advantageous for content such as books, content such as audio and video may advantageously use hashing in at least some embodiments.

Figure 7:
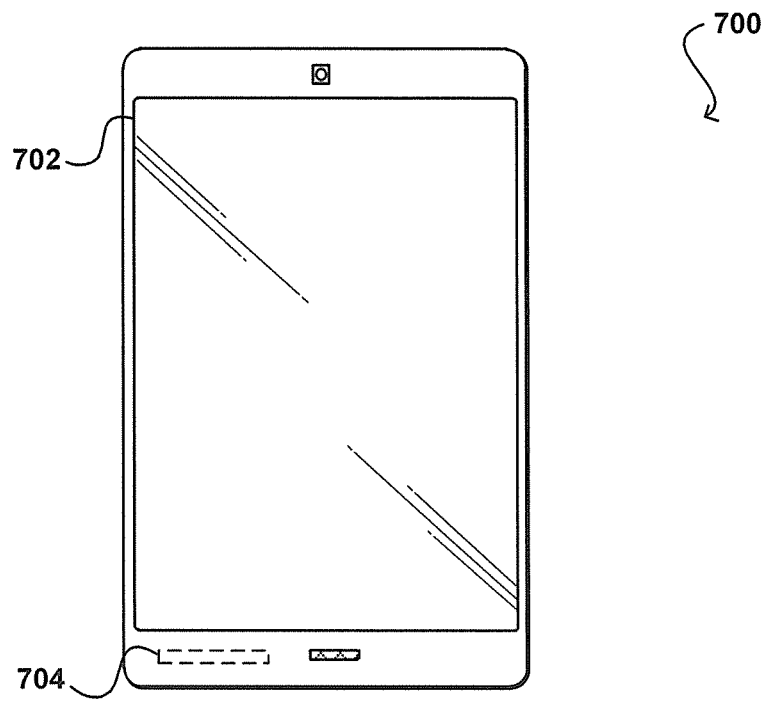
FIG. 7 illustrates an example computing device that can be used to implement aspects of the various embodiments.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 600 has a display screen 702 operable to display information to a user facing the display screen (e.g., on the same side of the computing device as the display screen). The computing device can include various elements enabling a user to provide input to the device, such as a touch-sensitive display screen 702, at least one camera, a microphone, a keyboard or touchpad, or other such elements. The example computing device 700 also includes at least one communication mechanism 704 enabling the device to send and receive communications over at least one network. These networks can include, for example, a local area network (LAN), the Internet, an intranet, a cellular network, a wireless data communications network, and the like.

Figure 8:
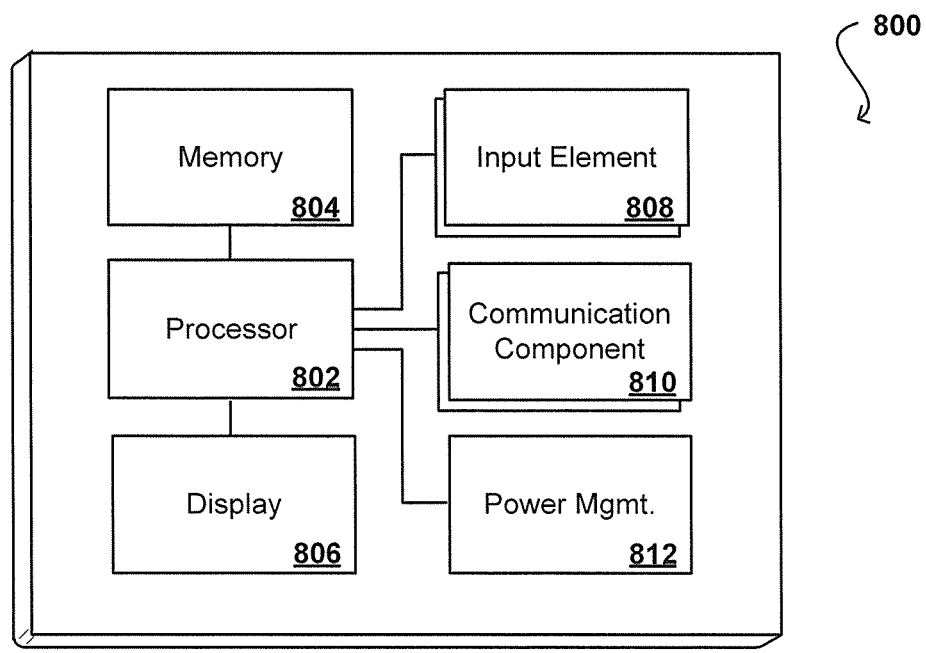
FIG. 8 illustrates components of an example computing device such as the one illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one input element 808 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 800 of FIG. 8 can include one or more communication components 810, such as a Wi-Fi, Bluetooth, RF, wired, or wireless communication system. The device in many embodiments can communicate with a network, such as the Internet, and may be able to communicate with other such devices. The device 800 also can include at least one power management component 812, which can be implemented through hardware and/or software. This can include a battery and other appropriate components.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers or cloud storage services, including without limitation those commercially available from Oracle®, Amazon®, Microsoft®, Sybase®, and IBM®, such as the Amazon Simple Storage Service (a.k.a. Amazon S3).

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other non-transitory computer-readable storage medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
   at least one processor; and
   memory including instructions that, when executed by the at least one processor, cause the system to:
   receive a request associated with a user profile, the request to access an omnibus electronic book (e-book) including at least a first e-book and a second e-book;
   determine that the user previously provided supplemental content associated with a position within an individual version of the first e-book;
   determine a beginning location of the individual version of the first e-book in the omnibus e-book by processing a beginning portion of the individual version of the first e-book to generate a beginning search string for the beginning portion of the individual version of the first e-book and comparing the beginning search string against one or more positions in the omnibus e-book;
   determine an end location of the individual version of the first e-book in the omnibus e-book by processing an end portion of the individual version of the first e-book to generate an end search string for the end portion of the individual version of the first e-book and comparing the end search string against the one or more positions in the omnibus e-book;
   determine a middle location of the individual version of the first e-book in the omnibus e-book by processing a middle portion of the individual version of the first e-book to generate a middle search string for the middle portion of the individual version of the first e-book and comparing the middle search string against the one or more positions in the omnibus e-book;
   create a set of associations between the individual version of the first e-book and the omnibus e-book, the set of associations including a first association for the beginning location, a second association for the end location, and a third association for the middle location of the individual version of the first e-book in the omnibus e-book; and
   cause the supplemental content to be displayed at a location in the omnibus e-book that is determined using the set of associations with a corresponding location of the supplemental content previously provided in the first e-book.

2. The system of claim 1, wherein a beginning search substring has a determined length, and wherein the instructions when executed further cause the system to:
   use the beginning search substring with a Boyer-Moore search process to cause a search to occur at positions within the omnibus e-book separated by distances corresponding to the determined length.

3. The system of claim 1, wherein the instructions when executed further cause the system to:

determine the beginning location of the individual version of the first e-book in the omnibus e-book by comparing the beginning search string against the one or more positions in the omnibus e-book until the beginning location of the individual version of the first e-book is located in the omnibus e-book that specifies to a string that corresponds to the beginning search string for the beginning portion of the individual version of the first e-book with at most a maximum amount of variation.

4. A computer-implemented method, comprising:

under control of one or more computer systems configured with executable instructions, receiving a request associated with a user profile, the request to access an omnibus content file including at least first content included in an individual content file and second content;

determining that a user associated with the user profile previously provided supplemental content associated with a position of the first content within the individual content file;

determining a beginning location of the first content in the omnibus content file by processing a beginning portion of the first content to generate a beginning search substring and analyzing the omnibus content file to locate a corresponding beginning portion of the omnibus content file for the beginning portion of the first content;

determining an end location of the first content in the omnibus content file by processing an end portion of the first content to generate an end search substring and analyzing the omnibus content file to locate a corresponding end portion of the omnibus content file for the end portion of the first content;

determining a set of associations between the individual content file and the omnibus content file, the set of associations including a first association for the beginning location and a second association for the end location of the first content in the omnibus content file; and causing the supplemental content to be available at a location in the omnibus content file that is determined using the set of associations with the corresponding location of the supplemental content previously provided in the first content within the individual content file.

5. The computer-implemented method of claim 4, further comprising:

generating a first hash of the beginning portion of the first content; and generating a sentence hash for a sentence of the omnibus content file, wherein analyzing the omnibus content file includes comparing the first hash to the sentence hash.

6. The computer-implemented method of claim 4, further comprising:

generating a first full hash of the first content from the individual content file;

generating a second full hash of a portion of the omnibus content file between the corresponding beginning portion of the omnibus content file and the corresponding end portion of the omnibus content file; and verifying that the first full hash matches the second full hash with at most a maximum amount of variation.

7. The computer-implemented method of claim 4, further comprising:

applying a Boyer-Moore search process to the beginning portion of the first content to generate the search substring, the search substring having a determined length, wherein the omnibus content file is able to be searched at positions determined based at least in part upon the determined length.

8. The computer-implemented method of claim 7, further comprising:

applying the Boyer-Moore search process to the end portion of the first content and three intermediate portions between the beginning portion and the end portion of the first content.

9. The computer-implemented method of claim 4, wherein the individual content file includes at least one of an e-book, a video, an audio file, a webpage, or an electronic document.

10. The computer-implemented method of claim 4, wherein the supplemental content includes at least one of a highlight, a footnote, a textual comment, an audio comment, a link to related content, a shared annotation, a messaging annotation, or a shared reading session.

11. The computer-implemented method of claim 4, wherein the beginning portion corresponds to a key frame of the first content.

12. The computer-implemented method of claim 4, further comprising:

storing the set of associations to a remote data repository accessible from multiple devices associated with the user profile.

13. A system, comprising:

at least one processor; and memory including instructions that, upon execution by the at least one processor, cause the system to:

receive a request associated with a user profile, the request to access an omnibus content file including at least first content included in an individual content file and second content;

determine that a user associated with the user profile previously provided supplemental content associated with a position of the first content within the individual content file;

determine a first location of the first content in the omnibus content file by processing a beginning portion of the first content to generate a beginning search substring and analyzing the omnibus content file to locate a corresponding beginning portion of the omnibus content file for the beginning portion of the first content;

determine an end location of the first content in the omnibus content file by processing an end portion of the first content to generate an end search substring and analyzing the omnibus content file to locate a corresponding end portion of the omnibus content file for the end portion of the first content;

determine a set of associations between the individual content file and the omnibus content file, the set of associations including a first association for the beginning location and a second association for the end location of the first content in the omnibus content file; and cause the supplemental content to be available at a location in the omnibus content file that is determined using the set of associations with the corresponding location of the supplemental content previously provided in the first content in the individual content file.

14. The system of claim 13, wherein the instructions when executed further cause the system to:

generate a first hash of the beginning portion of the first content; and generate a sentence hash for a sentence of the omnibus content file, wherein analyzing the omnibus content file includes comparing the first hash to the sentence hash.

15. The system of claim 13, wherein the instructions when executed further cause the system to:
generate a first hash of the beginning portion of the first content; and
generate respective hashes for portions of the omnibus content file, wherein analyzing the omnibus content file includes comparing the first hash to the respective hashes.

16. The system of claim 13, wherein the instructions when executed further cause the system to:
generate a first full hash of the first content from the individual content file;
generate a second full hash of a portion of the omnibus content file between the corresponding beginning portion of the omnibus content file and the corresponding end portion of the omnibus content file; and
verify that the first full hash matches the second full hash with at most a maximum amount of variation to confirm the corresponding beginning portion of the omnibus content file.

17. The system of claim 13, wherein the instructions when executed further cause the system to:
apply a Boyer-Moore search process to the beginning portion of the first content to generate the search substring, the search substring having a determined length, wherein the omnibus content file is able to be searched at positions determined based at least in part upon the determined length.

18. The system of claim 17, wherein the instructions when executed further cause the system to:
apply the Boyer-Moore search process to the end portion of the first content and three intermediate portions between the beginning portion and the end portion of the first content to generate a set of search substrings.

* * * * *